US009201797B1

(12) United States Patent
Egorov et al.

(10) Patent No.: US 9,201,797 B1
(45) Date of Patent: Dec. 1, 2015

(54) PER-SELECTOR DISPATCH

(71) Applicant: Google Inc., Mountain View, CA (US)

(72) Inventors: Vyacheslav Egorov, Aarhus (DK);
Kevin Scott Millikin, Lystrup (DK);
Srdjan Mitrovic, Atherton, CA (US);
Ivan Posva, Mountain View, CA (US);
Florian Schneider, Aarhus (DK)

(73) Assignee: Google Inc., Mountain View, CA (US)

( * ) Notice: Subject to any disclaimer, the term of this patent is extended or adjusted under 35 U.S.C. 154(b) by 265 days.

(21) Appl. No.: 13/895,267

(22) Filed: May 15, 2013

(51) Int. Cl.
*G06F 12/08* (2006.01)
*G06F 9/45* (2006.01)

(52) U.S. Cl.
CPC ............ *G06F 12/0862* (2013.01); *G06F 12/08* (2013.01); *G06F 8/4443* (2013.01)

(58) Field of Classification Search
CPC ................ G06F 2212/6042; G06F 2209/5021; G06F 2209/504; G06F 9/5005; G06F 9/5027; G06F 11/1407; G06F 8/75; G06F 11/3604; G06F 13/4204; G06F 17/30321; G06F 21/577; G06F 2213/0038; G06F 3/0412; G06F 3/044; G06F 12/01; G06F 17/218; G06F 17/2247; G06F 17/505; G06F 19/3431; G06F 1/1632; G06F 1/26; G06F 1/263; G06F 1/3203; G06F 5/06; G06F 8/31; G06F 8/425; G06F 8/427; G06F 9/45504; Y10S 707/99936
See application file for complete search history.

(56) References Cited

U.S. PATENT DOCUMENTS

| | | | | |
|---|---|---|---|---|
| 5,898,871 A | * | 4/1999 | Williamson et al. | 719/315 |
| 6,067,602 A | * | 5/2000 | Tremblay et al. | 711/132 |
| 7,283,991 B1 | * | 10/2007 | Kimmerly | 717/166 |
| 2002/0046298 A1 | * | 4/2002 | Bak et al. | 709/310 |
| 2004/0040029 A1 | * | 2/2004 | Debbabi et al. | 719/315 |
| 2005/0050455 A1 | * | 3/2005 | Yee et al. | 715/513 |
| 2005/0114863 A1 | * | 5/2005 | Williamson et al. | 719/310 |
| 2010/0145929 A1 | * | 6/2010 | Burger et al. | 707/713 |
| 2014/0282381 A1 | * | 9/2014 | Yoshida | 717/110 |

OTHER PUBLICATIONS

Compact Dispatch Tables for Dynamically Typed Object Oriented Languages by Jan Vitek and Nigel Horspool; Springer 1996.*
Optimizing Dynamically-Typed Object-Oriented Languages With Polymorphic Inline Caches by Urs Hoelzle, Craig Chambers, and David Ungar; Springer 1991.*

(Continued)

*Primary Examiner* — Nathan Sadler
*Assistant Examiner* — Paul Knight
(74) *Attorney, Agent, or Firm* — McDermott Will & Emery LLP

(57) ABSTRACT

Aspects of the subject technology relate to a computer-implemented process, including steps for compiling a first method call at a first call site in code of an object-oriented language, wherein the first call site is associated with a first selector, referencing a global cache comprising a plurality of per-selector caches, wherein each of the per-selector caches is indexed based on a corresponding selector identification and identifying a first per-selector cache, from among the plurality of per-selector caches, using the first selector. In certain aspects, the process can further include steps for invoking a method on a first object by performing a lookup in the first per-selector cache using a class associated with the first object to determine if a first target function exists in the first per-selector cache. Systems and computer readable media are also provided.

20 Claims, 5 Drawing Sheets

(56) References Cited

OTHER PUBLICATIONS iOS 4 Developers Cookbook, The: Core Concepts and Essential Recipes for iOS Programmers by Erica Sadun; Addison Wesley Professional; Nov. 2011.*

The Authoritative Dictionary of IEEE Standards Terms, 7$^{th}$ Edition; IEEE 2000.*

Implementing Statically Typed Object-Oriented Programming Languages by Ducournau, ACM 2011.*

TICLOS: An implementation of CLOS for the Explorer family; by Patrick Dussud; Lucid Inc. Jul. 1989 (OOPSLA Proceedings 1989).*

Using Method Lookup Caches and Register Windowing to Speed Up Dynamically-Bound Object-Oriented Applications by Ghose, Desai, and Koggee; IEEE 1996.*

Optimizing Smalltalk by Selector Code Indexing Can Be Practical by Onodera and Nakamura; IBM; 2007.*

Oracle Java SE Specifications Chapter 2. The Structure of the Java Virtual Machine; as published on Mar. 14, 2013; Section 2.6.*

* cited by examiner

PER-SELECTOR DISPATCH

BACKGROUND

The subject technology relates to systems and methods for optimizing method calls in dynamically-typed object-oriented languages, such as Dart.

Some conventional method call operations for dynamically-typed object oriented languages (and interface method calls in statically typed object oriented languages), require dynamic dispatch. In some implementations, dynamic dispatch involves the selection of a target function at runtime based on a class of the method receiver, and a method selector consisting of a method name and at least part of a method signature. However, runtime searches in the receiver class and corresponding super-classes for a target function matching the selector are often too slow for use in an optimized language implementation.

SUMMARY

The subject technology relates to a computer-implemented method, including steps for compiling a first method call at a first call site in code of an object-oriented language, wherein the first call site is associated with a first selector, referencing a global cache comprising a plurality of per-selector caches, wherein each of the per-selector caches is indexed based on a corresponding selector identification and identifying a first per-selector cache, from among the plurality of per-selector caches, using the first selector. In certain aspects, the method can further include steps for invoking a method on a first object by performing a lookup in the first per-selector cache using a class associated with the first object to determine if a first target function exists in the first per-selector cache.

In other aspects, the subject technology relates to a system including one or more processors and a computer-readable medium comprising instructions stored therein, which when executed by the processors, cause the processors to perform operations including compiling a first method call at a first call site in code of an object-oriented language, wherein the first call site is associated with a first selector, referencing a global cache comprising a plurality of per-selector caches, wherein each of the per-selector caches is indexed based on a corresponding selector identification and identifying a first per-selector cache, from among the plurality of per-selector caches, using the first selector. In certain aspects, the processors can be further configured to perform operations for invoking a method on a first object by performing a lookup in the first per-selector cache using a first class associated with the first object to determine if a first target function exists in the first per-selector cache, wherein the lookup is performed using a hash lookup based on the first class.

In yet another aspect, the subject technology relates to a computer-readable storage medium comprising instructions stored therein, which when executed by a processor cause the processor to perform operations including compiling a first method call at a first call site in code of an object-oriented language, wherein the first call site is associated with a first selector, referencing a global cache comprising a plurality of per-selector caches, wherein each of the per-selector caches is indexed based on a corresponding selector identification and identifying a first per-selector cache, from among the plurality of per-selector caches, using the first selector. In certain aspects, the processors can further perform operations for invoking a first method on a first object by performing a lookup in the first per-selector cache using a first class associated with the first object to determine if a first target function exists in the first per-selector cache, wherein the lookup is performed using a hash lookup based on the first class, and wherein the first class comprises a unique integer identifier.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these specific details. In some instances, structures and components are shown in block diagram form in order to avoid obscuring the concepts of the subject technology.

Some conventional method call lookup procedures utilize inline caching whereby a single class/target function pair (or a relatively small number of class/target function pairs) is cached, for example, at each call site. To dispatch a call, the call site's corresponding cache is searched for an entry having a class that matches the receiver class. If no match is found, a slower lookup mechanism can be used.

Figure 1:
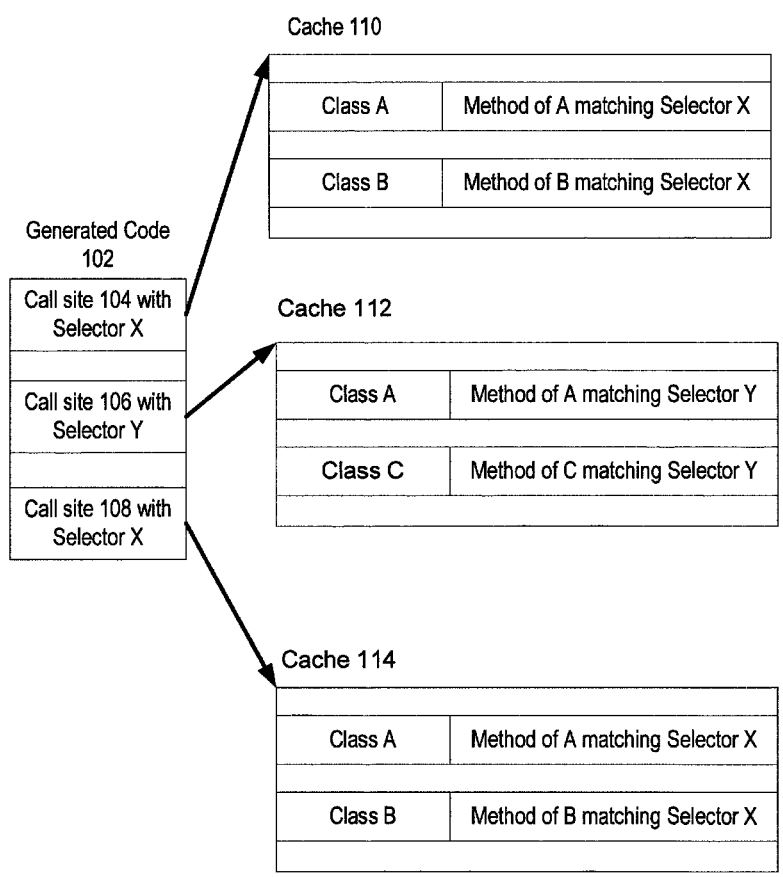
FIG. 1 illustrates an example of a per-call site inline cache, according to some conventional method call implementations.

FIG. 1 illustrates an example of a per-call site inline cache lookup, according to some conventional method call procedures. In the example of FIG. 1, generated code includes three different call sites (e.g., call site 104, call site 106 and call site 108). As shown, each of the call sites is associated with a respective inline cache, for example, call site 104 corresponds with cache 110, and call site 106 corresponds with cache 112, etc. In such implementations, the size of each inline cache associated with a respective call site is equal to the degree of the call site's polymorphism, that is, each inline cache has a size corresponding with the number of associated receiver classes.

Each of the call sites (e.g., call site 104, call site 106 and call site 108), in the example of FIG. 1, has a polymorphism of two. That is, each call site maps to a respective cache having two receiver classes, for example, cache 110 (associated with call site 104) has receiver classes A and B; cache 112 (associated with call site 106) has receiver classes A and C, and cache 114 (associated with call site 108) has receiver classes A and B. However, because inline caches are not shared between different call sites, a high degree of memory consumption can occur for cases where a large number of call sites are polymorphic (or where a few call sites are highly polymorphic).

To mitigate this issue, some conventional method invocation implementations utilize a single global cache after a certain degree of polymorphism is reached. However, such implementations can have several disadvantages. First, switching to a global cache can cause information about a call site's polymorphism (which has have value for adaptive compiling), to be discarded. Second, global caches often have large fixed sizes to both accommodate sharing between multiple sites, and to mitigate memory consumption. Thus, utilizing a global cache can incur a large memory cost, even if a single call site has a large degree of polymorphism. Third, because the global cache has a fixed size, information can be discarded too quickly if there are conflicting polymorphic call sites with large degrees of polymorphism. Fourth, many global cache implementations do not incorporate the full selector description into the lookup table. As a result, a dispatch target that is located in the global cache may be subject to additional lookup (e.g., against the selector), leading to inefficient operation.

Figure 2:
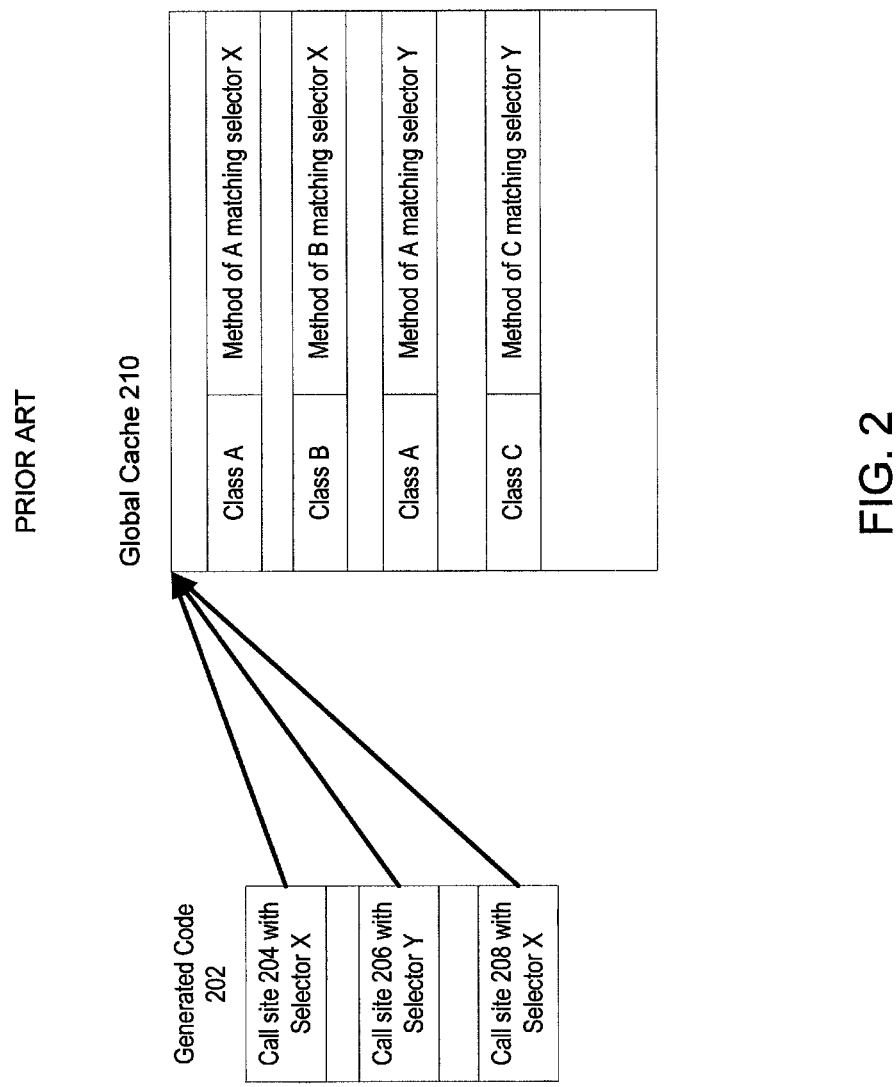
FIG. 2 illustrates a block diagram of an example global cache, according to some conventional implementations.

FIG. 2 illustrates a block diagram of an example global cache, according to some conventional implementations. As illustrated in FIG. 2, generated code 202 includes three call sites (e.g., call site 204, call site 206 and call site 208), as well as global cache 210 that stores class/target function pairs for different methods. It is understood that the number of call sites can vary by implementation, and that a larger number (or smaller number) of call sites can exist in the executed code.

Each of the call sites (e.g., call site 204, call site 206 and call site 208) map to global cache 210. When a method call is invoked for a particular call site, global cache 210 is referenced (e.g., using a global per-selector cache directory) and a lookup is performed based on a class/method selector pair (e.g., a method selector including a method name and at least part of a selector signature). For example, a method invocation performed at call site 204 can reference global cache 210 while passing a method selector to perform the lookup within a per-selector cache contained within global cache 210. Because, call site 204 is associated with selector X, only those entries in global cache 210 matching selector X are searched for the intended target function. Subsequently, a matching function can be selected on the basis of a matching class identifier, such as, a unique integer identifier for the requested class.

Method calls performed at the other call sites (e.g., call site 206 and call site 208) are handled in a similar manner. For example, when a method call is invoked at call site 206, a search is performed in global cache 210 among entries matching selector Y, to determine if a target function is available for the associated selector (e.g., for selector Y).

In some other conventional implementations, method call mechanisms can utilize a per-class dispatch cache, wherein a table is maintained for storing selector/target function pairs for each class. In per-class dispatch cache schemes, dynamic dispatch can be accomplished by referencing a lookup cache based on the associated class, and searching the lookup cache using a hash lookup for the corresponding selector, or another fast search method. If no target is found, a fallback lookup mechanism can be used. Once a target is located, it is added to the per-class dispatch cache for subsequent lookups. One drawback of per-class dispatch cache implementations is that the tables can also consume relatively large amounts of memory.

In yet another conventional dynamic dispatch method call approach, selector-indexed dispatched tables can be used, wherein each selector is assigned an identification, for example, using an integer value. The selector-indexed dispatch tables can be included in per-class tables of functions that are indexed by the selector identification. Such implementations can achieve relatively fast dynamic dispatch; however, selector indexed tables can take up even larger amounts of memory than hash-based dispatch tables. Furthermore, techniques that minimize the size of selector-indexed tables are often complicated to implement, slow to compute, and require access to the whole program.

Aspects of the subject technology address the above limitations of conventional method call procedures. In certain aspects, the subject technology utilizes a per-selector dispatch cache lookup, wherein call sites are mapped to dispatch caches based on a corresponding method selector (e.g., including a method name and at least part of a signature). In certain aspects, per-selector dispatch caches are stored in a global table that associates method selectors with the corresponding dispatch cache. Because the per-selector cache can be referenced using only the method name and signature (e.g., the method selector), the table addresses for each call site can be known at compile time, and embedded in the dispatching code. As compared to per-class dispatch caches, per-selector dispatches caches reduce the memory load needed to read the dispatch table at runtime as they enable sharing of caches between call sites, and eliminate runtime overhead of such sharing because the lookup no longer has to be checked against the selector. This also makes the lookup procedure faster, because the key is just a class itself, and not a class/selector pair.

In certain implementations, the per-selector cache stores class/target function pairs. Dynamic dispatch is implemented by searching the per-selector cache via a hash lookup based on class (e.g., based on a unique integer identifier assigned to the class), or another fast search method. If a target function is found, the target function is invoked. Alternatively, if the target function is not found, then a full lookup mechanism can be used and the result (once located) can be stored into the appropriate cache.

Figure 3:
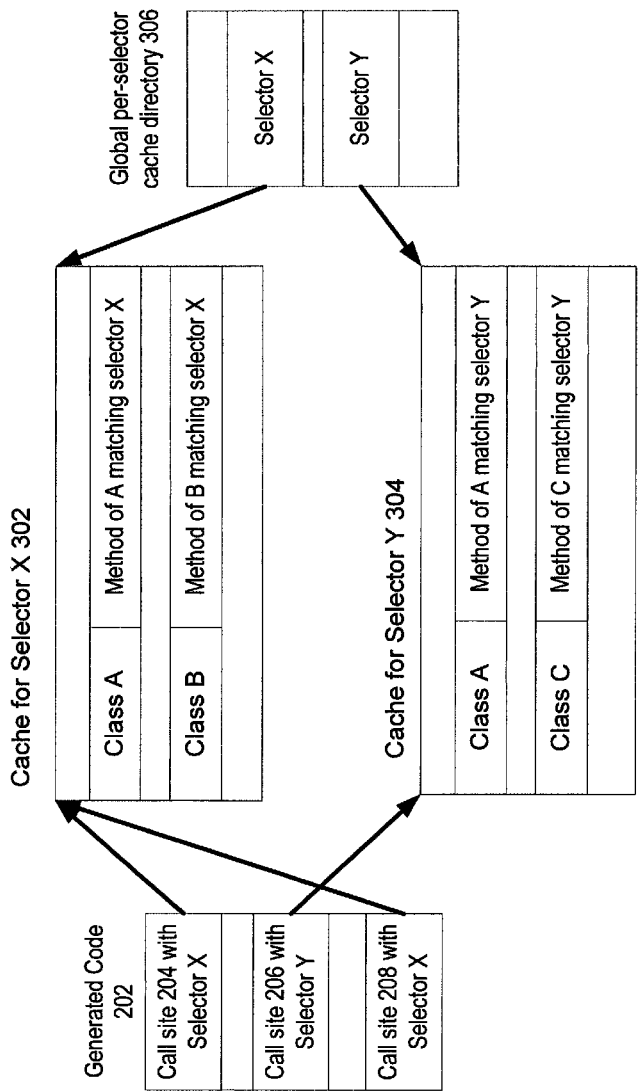
FIG. 3. illustrates a block diagram of per-selector cache lookup using a global per-selector cache directory, according to some aspects of the subject technology.

FIG. 3 conceptually illustrates a block diagram of a per-selector cache lookup using global per-selector cache directory 306. That is, FIG. 3 illustrates how entries of in the global cache (e.g., global cache 210) can be grouped into various per-selector caches based on their associated selector. For example, FIG. 3 illustrates that the entries in global cache 210, can be sub-grouped into those matching selector X (e.g., cache for selector X 302) and those matching selector Y (e.g., cache for selector Y 304). However, it is understood that a greater number (or fewer number) of selector groups can be used, depending on implementation.

By way of example, a method call performed at call site 206 matches selector X, and thus, cache for selector X 302 is referenced, which includes only entries corresponding with selector X. Because the entries contained in the cache for selector X are already known to match selector X, the functions can be quickly searched with respect to class, without the need to determine whether a potential target provides the desired selector match.

Selectors used at polymorphic call sites can have a large number of receiver classes that reach those call sites. Likewise, the selectors used at some polymorphic call sites can correspond with a small number of receiver classes. As such, in some implementations, a size of the per-selector cache can be adjusted to accommodate the degree of polymorphism of a call site.

In certain aspects, a per-selector cache can be initialized to a minimum size, for example, having a minimum number of entries. Growth policies can be implemented to allow the per-selector dispatch cache to grow in size. Although growth policies can vary with implementation, in one example, the dispatch cache may be enlarged upon reaching a predetermined threshold fill factor (e.g., 75%). Growth policies can allow per-selector caches for small degrees of polymorphism to remain small, while per-selector caches for large degrees of polymorphism can grow large. Furthermore, a heuristic can be put in place to split the per-selector cache into several call site specific per-selector caches, for example, if it is determined that call sites have non-intersecting sets of observed receiver classes.

Figure 4:
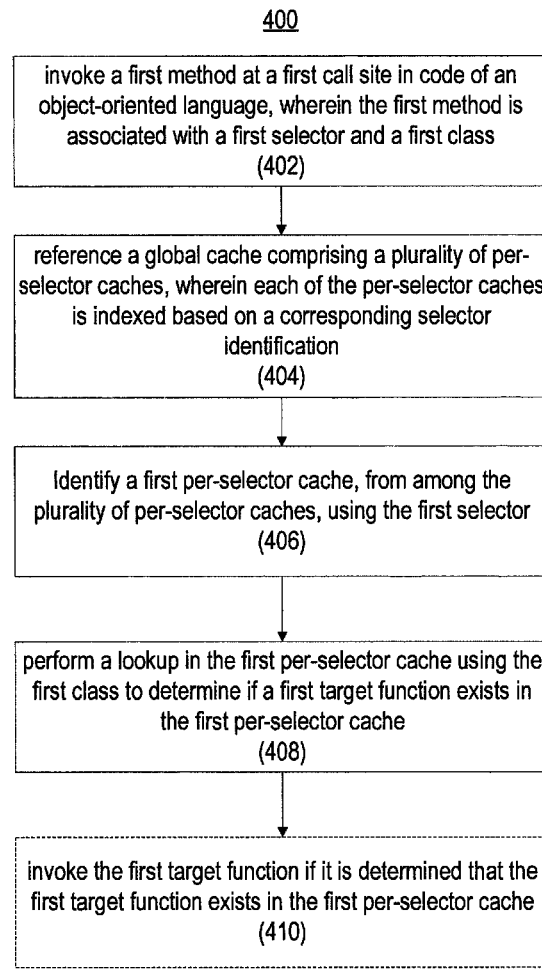
FIG. 4 illustrates a flow diagram of an example process for compiling a method call and invoking a method, according to certain aspects of the subject technology.

FIG. 4 illustrates an example of a method 400 for compiling a method call and invoking a method, according to certain aspects of the subject technology. Method 400 begins with step 402 in which a method call at a call site is compiled. The call site is associated with a method selector. Although, method calls can be invoked in various computer programming languages, in certain aspects, the method call invocations of the subject technology occur in object-oriented languages, such as Dart.

Subsequently, in step 404, a global cache directory including a plurality of per-selector caches is referenced, wherein each of the per-selector caches is indexed based on a corresponding selector identification. Referring again to the example of FIG. 3, target function entries matching selector X can be grouped into a cache for selector X, and entries matching selector Y can be grouped in a cache for selector Y.

In step 406, a per-selector cache is identified, from among the plurality of per-selector caches, using the selector. As discussed above, the identification of the per-selector cache may be performed using a global per-selector cache directory that groups each entry in the global cache based on an associated selector (e.g., where functions associated with common selectors are grouped together).

When the method is invoked on an object, in step 408, a lookup is performed in the per-selector cache using the object's class to determine if a target function exists in the per-selector cache. As described above, a class search (e.g., in the per-selector cache), can be performed quickly because each target function contained therein is already known to match the selector associated with the call site. As such, the per-selector cache need only be searched to find a matching class, without the need to determine/verify if a potential target function also matches the necessary selector.

In optional step 410, if it is determined that the target function exists in the first per-selector cache, the target function is invoked. However, in some implementations, the intended target function may not be found, and in such cases the target function can be searched using another lookup method. Once the target function is found it can be added to the correct per-selector cache and made available for subsequent lookups.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
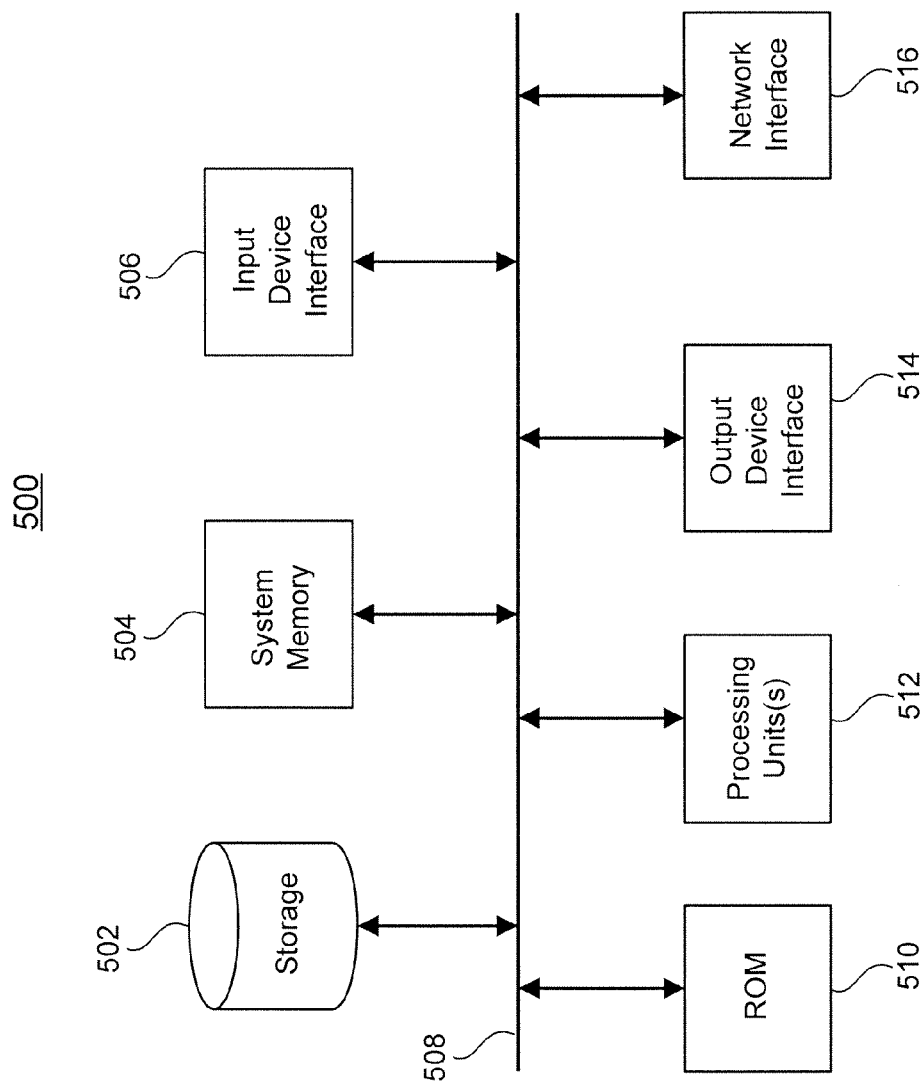
FIG. 5 is a block diagram of an example electronic system with which some aspects of the subject technology can be implemented.

FIG. 5 conceptually illustrates an electronic system 500 with which some implementations of the subject technology are implemented. Electronic system 500 can be a computer, phone, PDA, or any other sort of processor-based electronic device. Such an electronic system can include various types of computer readable media and interfaces for various other types of computer readable media. Electronic system 500 includes bus 508, storage 502, system memory 504, input device interface 506, ROM 510, processing unit(s) 512, output device interface 514 and network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and storage 502. From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Storage 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as storage 502.

Other implementations use a removable storage device (such as a floppy disk, flash drive, and its corresponding disk drive) as storage 502. Like storage 502, system memory 504 is a read-and-write memory device. However, unlike storage 502, system memory 504 is a volatile read-and-write memory, such a random access memory. System memory 504 stores some of the instructions and data that the processor needs at runtime. In some implementations, the processes of the subject disclosure are stored in system memory 504, storage 502, and/or ROM 510. For example, the various memory units include instructions for conducting experiments in accordance with some implementations. From these various memory units, processing unit(s) 512 retrieves instructions to execute and data to process in order to execute the processes of some implementations.

Bus 508 also connects to input and output device interfaces 506 and 514. Input device interface 506 enables the user to communicate information and select commands to the electronic system. Input devices used with input device interface 506 can include, for example, alphanumeric keyboards and pointing devices (also called "cursor control devices"). Output device interface 514 enables, for example, the display of images generated by the electronic system 500. Output devices used with output device interface 514 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
    compiling a first method call at a first call site in code of an object-oriented language, wherein the first call site is associated with a first method selector;
    referencing a plurality of per-selector caches, each per-selector cache being associated with a respective method selector and available to multiple call sites that use the respective method selector, wherein each per-selector cache is configured to be searched based on a corresponding class identification when called from a respective call site;
    identifying a first per-selector cache, from among the plurality of per-selector caches, using the first method selector; and
    invoking a method on a first object by performing a lookup in the first per-selector cache using a class associated with the first object to determine if a first target function exists in the first per-selector cache.

2. The computer-implemented method of claim 1, wherein the lookup in the first per-selector cache is performed using a hash lookup based on the class associated with the first object, and wherein the class comprises a unique integer identifier.

3. The computer-implemented method of claim 1, further comprising:
    invoking the first target function, if it is determined that the first target function exists in the first per-selector cache.

4. The computer-implemented method of claim 1, further comprising:
    performing a full lookup to locate the first target function, if the first target function is determined not to exist in the first per-selector cache; and
    adding the first target function to the first per-selector cache.

5. The computer-implemented method of claim 1, further comprising:
    adjusting a size of the first per-selector cache based on a fill level of the first per-selector cache.

6. The computer-implemented method of claim 1, further comprising:
    invoking the method on a second object at the first call site, wherein the first call site is associated with the first per-selector cache; and
    performing a lookup in the first per-selector cache using a second class associated with the second object to determine if a second target function exists in the first per-selector cache.

7. The computer-implemented method of claim 1, further comprising:
    invoking the method on a third object at a second call site, wherein the second call site is associated with the first per-selector cache; and
    performing a lookup in the first per-selector cache using a third class associated with the third object to determine if a third target function exists in the first per-selector cache.

8. A system comprising:
    one or more processors; and
    a computer-readable medium comprising instructions stored therein, which when executed by the processors, cause the processors to perform operations comprising:
        compiling a first method call at a first call site in code of an object-oriented language, wherein the first call site is associated with a first method selector;
        referencing a plurality of per-selector caches, each per-selector cache being associated with a respective method selector and available to multiple call sites that use the respective method selector, wherein each per-selector cache is configured to be searched based on a corresponding class identification when called from a respective call site;
        identifying a first per-selector cache, from among the plurality of per-selector caches, using the first method selector; and invoking a method on a first object by performing a lookup in the first per-selector cache using a first class associated with the first object to determine if a first target function exists in the first per-selector cache, wherein the lookup is performed using a hash lookup based on the first class.

9. The system of claim 8, wherein the first class associated with the first object comprises a unique integer identifier.

10. The system of claim 8, wherein the processors are further configured to perform operations comprising:
invoking the first target function if it is determined that the first target function exists in the first per-selector cache.

11. The system of claim 8, wherein the processors are further configured to perform operations comprising:
performing a full lookup to locate the first target function, if the first target function is determined not to exist in the first per-selector cache; and
adding the first target function to the first per-selector cache.

12. The system of claim 8, wherein the processors are further configured to perform operations comprising:
adjusting a size of the first per-selector cache, based on a fill level of the first per-selector cache.

13. The system of claim 8, wherein the processors are further configured to perform operations comprising:
invoking a method on a second object at the first call site, wherein the call site is associated with the first per-selector cache; and
performing a lookup in the first per-selector cache using a second class associated with the second object to determine if a second target function exists in the first per-selector cache.

14. The system of claim 8, wherein the processors are further configured to perform operations comprising:
invoking a method on a third object at a second call site, wherein the second call site is associated with the first per-selector; and
performing a lookup in the first per-selector cache using a third class associated with the third object to determine if a third target function exists in the first per-selector cache.

15. A computer-readable storage medium comprising instructions stored therein, which when executed by a processor, cause the processor to perform operations comprising:
compiling a first method call at a first call site in code of an object-oriented language, wherein the first call site is associated with a first method selector;
referencing a plurality of per-selector caches, each per-selector cache being associated with a respective method selector and available to multiple call sites that use the respective method selector, wherein each per-selector cache is configured to be searched based on a corresponding class identification when called from a respective call site;
identifying a first per-selector cache, from among the plurality of per-selector caches, using the first method selector; and
invoking a first method on a first object by performing a lookup in the first per-selector cache using a first class associated with the first object to determine if a first target function exists in the first per-selector cache, wherein the lookup is performed using a hash lookup based on the first class, and wherein the first class comprises a unique integer identifier.

16. The computer-readable storage medium of claim 15, the operations further comprising:
invoking the first target function if it is determined that the first target function exists in the first per-selector cache.

17. The computer-readable storage medium of claim 15, the operations further comprising:
performing a full lookup to locate the first target function, if the first target function is determined not to exist in the first per-selector cache; and
adding the first target function to the first per-selector cache.

18. The computer-readable storage medium of claim 15, the operations further comprising: adjusting a size of the first per-selector cache, based on a fill level of the first per-selector cache.

19. The computer-readable storage medium of claim 15, the operations further comprising:
invoking a method on a second object at the first call site, wherein the first call site is associated with the first per-selector cache; and
performing a lookup in the first per-selector cache using a second class associated with the second object to determine if a second target function exists in the first per-selector cache.

20. The computer-readable storage medium of claim 15, the operations further comprising:
invoking a method on a third object at a second call site, wherein the second call site is associated with the first per-selector cache; and
performing a lookup in the first per-selector cache using a third class associated with the third object to determine if a third target function exists in the first per-selector cache.

* * * * *